United States Patent
Kuo et al.

(10) Patent No.: US 11,968,556 B2
(45) Date of Patent: Apr. 23, 2024

(54) NETWORK QUALITY MEASUREMENT METHOD AND SYSTEM

(71) Applicant: Industrial Technology Research Institute, Hsinchu (TW)

(72) Inventors: Hui-Ping Kuo, Hsinchu (TW); Sheng-Chieh Huang, Hsinchu (TW); Hsin-Hui Hwang, Hsinchu (TW); Yi-Ming Wu, New Taipei (TW); Man Ju Chien, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 355 days.

(21) Appl. No.: 17/561,993

(22) Filed: Dec. 26, 2021

(65) Prior Publication Data

US 2023/0180035 A1   Jun. 8, 2023

(30) Foreign Application Priority Data

Dec. 3, 2021 (TW) .................................. 110145224

(51) Int. Cl.
*H04W 4/02* (2018.01)
*H04W 4/024* (2018.01)
(Continued)

(52) U.S. Cl.
CPC ........... *H04W 24/10* (2013.01); *H04W 4/024* (2018.02); *H04W 4/027* (2013.01); *H04W 4/40* (2018.02); *H04W 16/22* (2013.01)

(58) Field of Classification Search
CPC ....... H04W 24/10; H04W 4/024; H04W 4/40; H04W 4/027; H04W 16/22
See application file for complete search history.

(56) References Cited

U.S. PATENT DOCUMENTS 9,030,959 B2   5/2015   Shim
9,503,216 B2   11/2016   Siomina et al.
(Continued)

FOREIGN PATENT DOCUMENTS

CN   109218962   1/2019
CN   110741665   1/2020
(Continued)

OTHER PUBLICATIONS

Joonas Sae et al., "Public LTE Network Measurements with Drones in Rural Environment," 2019 IEEE 89th Vehicular Technology Conference (VTC2019-Spring), Apr. 2019, pp. 1-5.
(Continued)

*Primary Examiner* — Moustapha Diaby
(74) *Attorney, Agent, or Firm* — JCIPRNET (57) ABSTRACT

A network quality measurement method and system are provided. In the method, a movement path and a movement speed of a vehicle device are determined according to a size of a space and an endurance time of the vehicle device, and the vehicle device is controlled to move on the movement path at the movement speed. During a movement of the vehicle device, a network quality in the space is measured according to a measurement frequency to generate network quality data. Whether the network quality in the space is changed is determined according to the network quality data. Whether there is an obstacle around the vehicle device is detected. When it is determined that the network quality in the space is changed or the obstacle is detected around the vehicle device, at least one of the movement path, the movement speed, and the measurement frequency is adjusted.

20 Claims, 6 Drawing Sheets

(51) Int. Cl.
  *H04W 4/40* (2018.01)
  *H04W 16/22* (2009.01)
  *H04W 24/10* (2009.01)
  *H04W 64/00* (2009.01)

(56) References Cited

U.S. PATENT DOCUMENTS

| | | | |
|---|---|---|---|
| 9,538,439 | B2 | 1/2017 | Pica et al. |
| 9,668,146 | B2 | 5/2017 | Lau |
| 9,780,890 | B2 | 10/2017 | Pauly et al. |
| 10,234,862 | B2 | 3/2019 | Teague |
| 10,327,151 | B2 | 6/2019 | Priest et al. |
| 2018/0017973 | A1* | 1/2018 | Teague .................. H04W 24/08 |
| 2020/0015107 | A1* | 1/2020 | Takahashi ......... H04W 36/0058 |
| 2023/0370939 | A1* | 11/2023 | Ko ........................ H04W 40/20 |

FOREIGN PATENT DOCUMENTS

| | | |
|---|---|---|
| CN | 112309175 | 2/2021 |
| TW | I721649 | 3/2021 |
| TW | 202200450 | 1/2022 |

OTHER PUBLICATIONS

Chao-Yang Lee, "Cooperative Drone Positioning Measuring in Internet-of-Drones," 2020 IEEE 17th Annual Consumer Communications & Networking Conference (CCNC), Jan. 2020, pp. 1-4.
Christian Raffelsberger et al., "A Performance Evaluation Tool for Drone Communications in 4G Cellular Networks," 2019 16th International Symposium on Wireless Communication Systems (ISWCS), Aug. 2019, pp. 1-4.
M. A. A. Akkad et al., "Available Bandwidth Guided On-Demand Distance Vector Protocol for FANETs," Proceeding of the 27th Conference of Fruct Association, Sep. 2020, pp. 279-287.
"Office Action of Taiwan Counterpart Application", dated Aug. 9, 2022, p. 1-p. 24.

* cited by examiner

NETWORK QUALITY MEASUREMENT METHOD AND SYSTEM

CROSS-REFERENCE TO RELATED APPLICATION

This application claims the priority benefit of Taiwan application serial no. 110145224, filed on Dec. 3, 2021. The entirety of the above-mentioned patent application is hereby incorporated by reference herein and made a part of this specification.

TECHNICAL FIELD

The disclosure relates to a quality measurement method and system, and relates to a network quality measurement method and system.

BACKGROUND

There is an increasing demand for high-bandwidth and low-latency mobile network deployment in application fields such as drone sports, drone performances, or smart factories. In particular, drone competitions have received much attention in recent years and have become one of the most popular events. There are now FAI (Fédération Aéronautique Internationale), DRL (Drone Racing League) and other competition leagues regularly holding competitions around the world, which has promoted business opportunities for sports broadcasting and peripheral advertising.

The images used by the current competitive drones are analog signals with low screen resolution and full of noise, and therefore it is difficult to meet the demand for rebroadcasting high-quality images. The deployment of 5G private network may solve the above issues. High-speed bandwidth data performance and millisecond-level latency performance mean that more data may be handled and the quality of image transmission is simultaneously improved, thus bringing clear and shocking image performance to significantly enhance entertainment effect and experience.

The traditional method of network deployment is to collect measurement data by means of manual fixed-point sampling through a frequency scanner or running a program. However, using this method for network deployment in the application field of 5G private network results in the following issues: manual fixed-point sampling may not measure the network quality in three-dimensional (3D) space, and fixed-point measurement is slow and inefficient. Moreover, after measuring network quality, how to apply the network quality to network deployment adjustments or to efficiently present the good and bad distribution of network quality in the entire measurement space is another issue worthy of attention.

SUMMARY

An embodiment of the disclosure provides a network quality measurement method suitable for a vehicle device. The method includes determining a movement path and a movement speed of a vehicle device according to a size of a space and an endurance time of the vehicle device, and controlling the vehicle device to move on the movement path at the movement speed; measuring a network quality in the space according to a measurement frequency during a movement of the vehicle device to generate network quality data; determining whether the network quality in the space is changed according to the network quality data; detecting whether there is an obstacle around the vehicle device; and adjusting at least one of the movement path, the movement speed, and the measurement frequency when it is determined that the network quality in the space is changed or the obstacle is detected around the vehicle device.

An embodiment of the disclosure provides a network quality measurement system including a vehicle device. The vehicle device includes a controller, a network quality measurer, and an obstacle detector. The controller is configured to determine a movement path and a movement speed of the vehicle device according to a size of a space and an endurance time of the vehicle device, and the vehicle device is controlled to move on the movement path at the movement speed. The network quality measurer is coupled to the controller and configured to measure a network quality in the space according to a measurement frequency during a movement of the vehicle device to generate network quality data. The obstacle detector is coupled to the controller and configured to detect whether there is an obstacle around the vehicle device. The controller determines whether the network quality in the space is changed according to the network quality data. When the controller determines that the network quality in the space is changed or the obstacle detector detects the obstacle around the vehicle device, the controller adjusts at least one of the movement path, the movement speed, and the measurement frequency.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

For the private network application field where network quality is highly demanded, the existing measurement methods may not be able to obtain network status in stereoscopic space, thus making the deployment of an aerial vehicle difficult. In addition, the efficiency of the existing measurement methods is not good, and the needs of rapid adjustment and deployment in line with site changes are not readily met.

To solve these two major issues, the embodiments of the disclosure provide a network quality measurement method and system. This method measures the network quality in the space during the movement of the aerial vehicle using a network quality measurer, and detects the environment around the aerial vehicle using an obstacle detector. By obtaining the above information, it may be determined whether the network quality in the space is changed and whether there is an obstacle around the aerial vehicle, and in the presence of at least one of the above, the deployment is adjusted to enhance the measurement for regions with poor network quality. In addition, this method may also visualize a measurement result combined with images, thereby improving the efficiency of viewing the measurement result and making the efficiency of network deployment clear at a glance.

Figure 1:
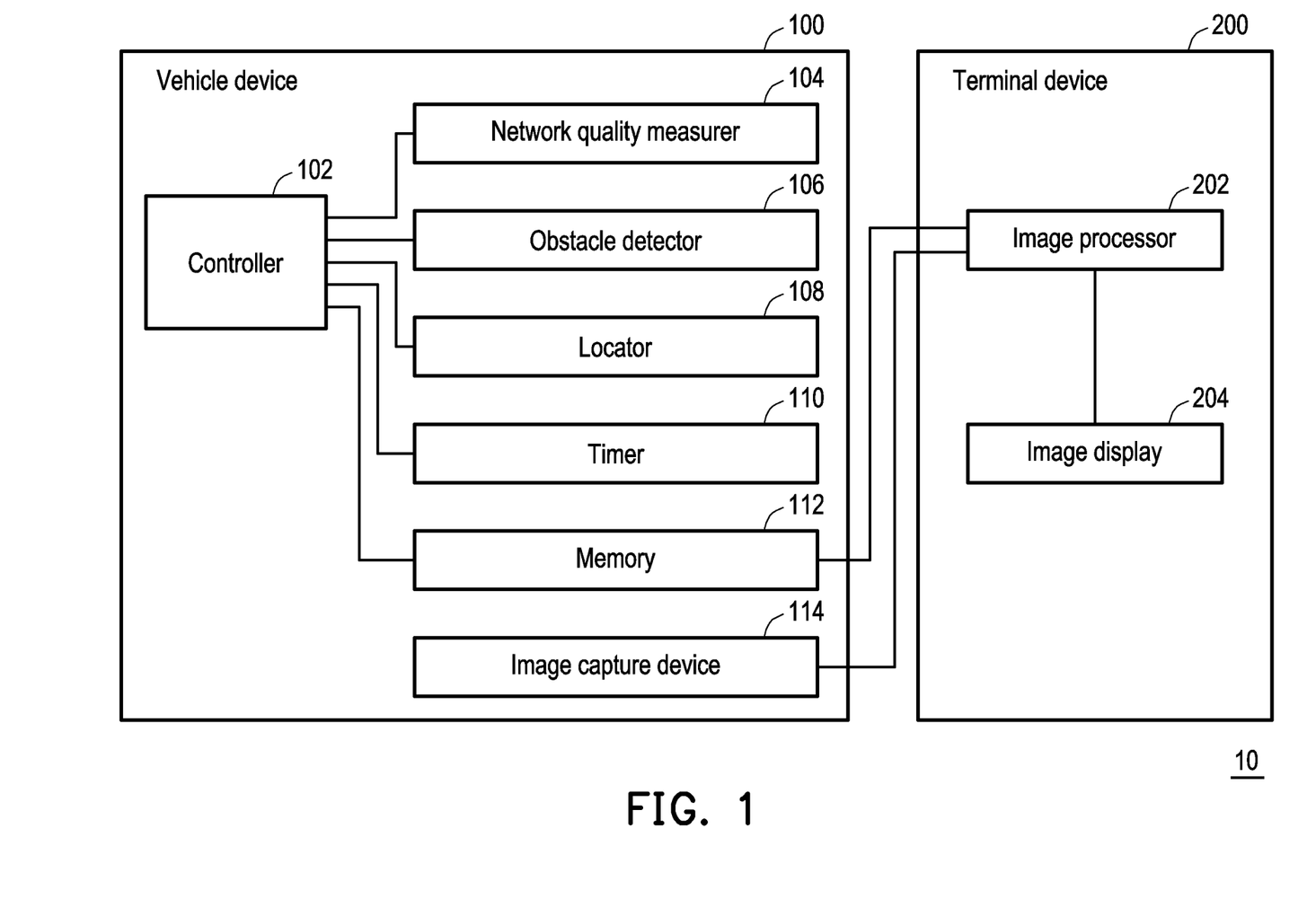
FIG. 1 is a block diagram of a network quality measurement system shown according to an embodiment of the disclosure.

FIG. 1 is a block diagram of a network quality measurement system shown according to an embodiment of the disclosure. Please refer to FIG. 1, a network quality measurement system 10 of the present embodiment includes a vehicle device 100. The vehicle device 100 is, for example, an unmanned aerial vehicle, and may be a drone, but is not limited thereto. In the present embodiment, the vehicle device 100 includes a controller 102, a network quality measurer 104, and an obstacle detector 106.

The controller 102 is, for example, a central processing unit (CPU) or a programmable general-use or special-use microprocessor, digital signal processor (DSP), programmable controller, application-specific integrated circuit (ASIC), or other similar devices or a combination of these devices.

The network quality measurer 104 may measure network information such as available bandwidth, response latency, network jitter, packet loss rate, received signal strength indication (RSSI), etc., and is coupled to the controller 102, and transmits the measured data to the controller 102, so that the controller 102 may determine whether the network quality of the surrounding environment of the vehicle device 100 is changed.

The obstacle detector 106 is, for example, a radar, a sound wave sensing device, or an optical sensing device, such as an element having the function of sensing the distance of an object such as an optical radar adopting optical ranging (Light Detection And Ranging, LiDAR), a depth-of-field camera, an image capture device, etc. In the present embodiment, the obstacle detector 106 may detect the surrounding environment, and is coupled to the controller 102, and transmits the detected data to the controller 102, so that the controller 102 may determine whether there is an obstacle in the surrounding environment of the vehicle device 100.

In an embodiment, the vehicle device 100 includes a locator 108, a timer 110, and a memory 112.

The locator 108 obtains the size (including length, width, and height) of the space to be measured by the vehicle device 100 using a positioning system (for example, Global Positioning System (GPS), Real-Time Kinematic (RTK) positioning system, or Ultra-Wideband (UWB) positioning system, etc.), and is coupled to the controller 102, so that the controller 102 obtains the coordinate position of the vehicle device 100 via the locator 108 according to the size of the space and the measurement frequency.

The timer 110 is coupled to the controller 102 and generates a clock signal and outputs the clock signal to the controller 102, so that the controller 102 obtains the measurement timestamp of the current measurement network quality according to the clock signal.

The memory 112 is, for example, any type of random-access memory (RAM), read-only memory (ROM), flash memory, hard drive, a similar element, or a combination of the elements. In the present embodiment, the memory 112 is coupled to the controller 102, and the controller 102 integrates the coordinate information and the measurement time stamp to generate a measurement record, and stores the measurement record in the memory 112. The measurement record includes movement speed, movement path, measurement frequency, and network quality data corresponding to the coordinate information and the measurement timestamp.

In yet another embodiment, the vehicle device 100 includes an image capture device 114, and the network quality measurement system 10 includes a terminal device 200. The terminal device 200 is, for example, a notebook computer, a tablet computer, a smart phone, or a personal digital assistant (PDA), but is not limited thereto. In the present embodiment, the terminal device 200 includes an image processor 202 and an image display 204.

The image capture device 114 is, for example, an electronic device having a function of capturing or shooting images, such as a camera or an infrared or visible light camera. In the present embodiment, the image capture device 114 captures an image during the movement of the vehicle device 100.

The image processor 202 is, for example, a central processing unit (CPU) or a general-purpose or special-purpose programmable microprocessor, digital signal processor (DSP), programmable controller, application-specific integrated circuit (ASIC), or other similar devices or a combination of the above devices, but is not limited thereto. In the present embodiment, the image processor 202 is coupled to the memory 112 and the image capture device 114. The image processor 202 may obtain various data from the memory 112 and obtain an image from the image capture device 114 to execute the method for visualizing a measurement result of an embodiment of the disclosure to generate a visualized image.

The image display 204 is, for example, a device having a display function such as a liquid-crystal display panel (LCD) or an organic light-emitting diode (OLED), but is not limited thereto. In the present embodiment, the image display 204 is coupled to the image processor 202 and displays a visualized image generated by the image processor 202.

Figure 2:
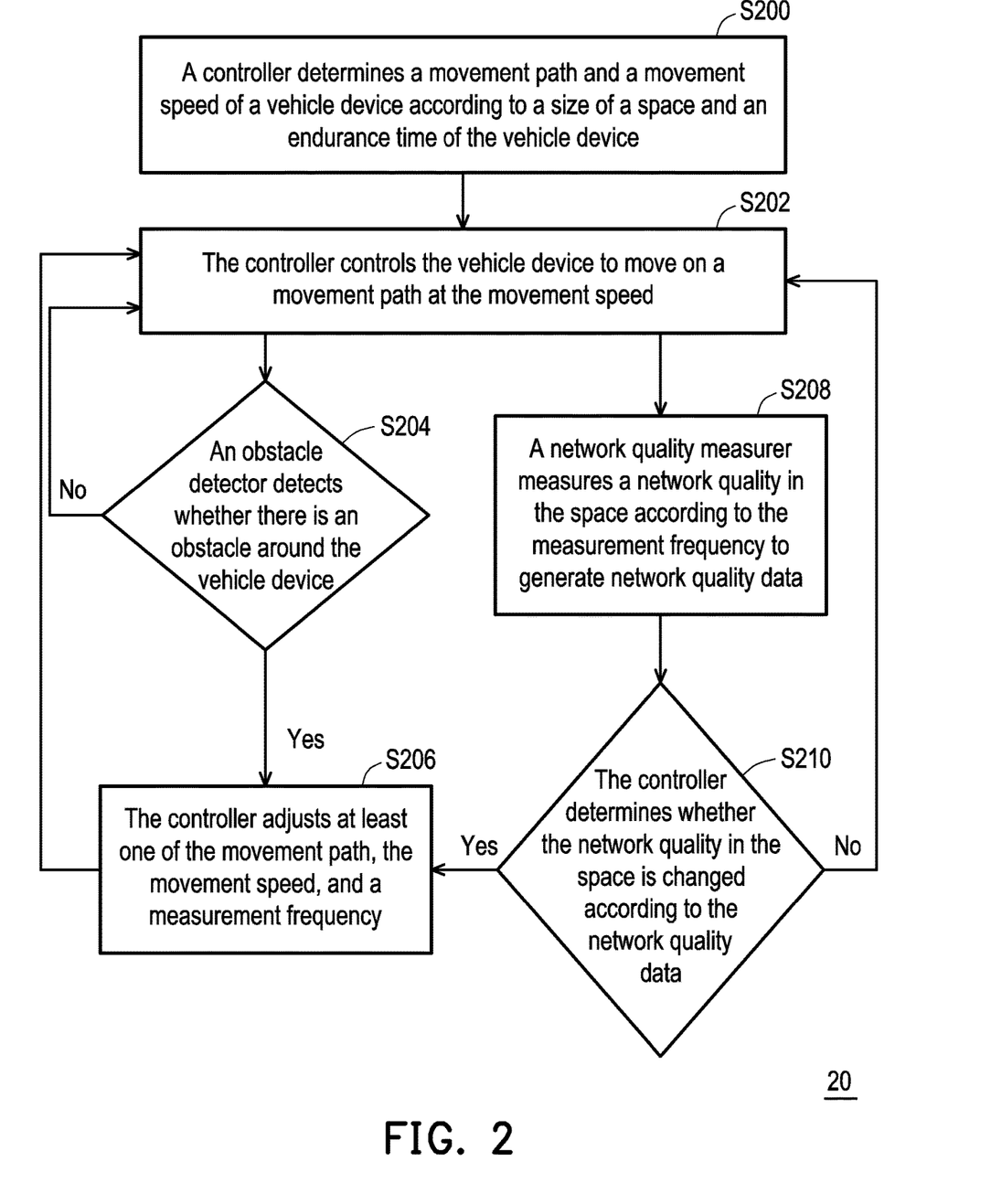
FIG. 2 is a flowchart of a network quality measurement method shown according to an embodiment of the disclosure.

FIG. 2 is a flowchart of a network quality measurement method shown according to an embodiment of the disclosure. Referring to both FIG. 1 and FIG. 2, a method 20 of the present embodiment is applicable to the network quality measurement system 10 of FIG. 1. The following is a description of the detailed steps of the network quality measurement method of the disclosure in conjunction with the operation relationship between the devices in the network quality measurement system 10.

First, in step S200, the controller 102 determines the movement path and movement speed of the vehicle device 100 according to the size of the space and the endurance time of the vehicle device 100. The controller 102 obtains the size of the space to be measured by the vehicle device 100 via the locator 108, and according to the size of the space and the endurance time of the vehicle device 100, estimates flight parameters such as movement speed, detour density, detour sequence, number of repetitions, pause mode, and interval of the vehicle device 100. In an embodiment, the flight time of the vehicle device 100 is a certain proportion (for example, 50%) of the maximum endurance time to retain the flexibility of dynamically changing the measurement method subsequently. In an embodiment, the movement path may first go around the XY plane at a fixed height and then at a different height, but is not limited thereto.

In step S202, the controller 102 controls the vehicle device 100 to move on the movement path at the movement speed. During the movement of the vehicle device 100, the obstacle detector 106 and the network quality measurer 104 may simultaneously perform step S204 and step S208 respectively (exemplified as such in the present embodiment). In an embodiment, the obstacle detector 106 and the network quality measurer 104 may also perform step S204 and step S208 respectively in sequence, and vice versa.

In step S204, the obstacle detector 106 detects whether there is an obstacle around the vehicle device 100. When the obstacle detector 106 detects that there is an obstacle around the vehicle device 100, step S206 is performed, and the controller 102 adjusts at least one of the movement path, the movement speed, and the measurement frequency. Then, returning to step S202, the controller 102 controls the vehicle device 100 to move on the adjusted movement path at the adjusted movement speed.

When the obstacle detector 106 detects that an obstacle is within a predetermined distance from the vehicle device 100, the controller 102 obtains the obstacle distance between the vehicle device 100 and the obstacle from the obstacle detector 106. Next, the controller 102 adjusts at least one of the movement path, the movement speed, and the measurement frequency according to the distance of the obstacle (for example, reducing the movement speed or adjusting the detour density), and updates the measurement record in the memory 112 according to at least one of the adjusted movement path, movement speed, and measurement frequency and the obstacle distance. In an embodiment, the predetermined distance may be a radius of 5 meters centered on the vehicle device 100 or any value, and the disclosure is not limited in this regard.

In an embodiment, when the controller 102 determines that the obstacle may collide with the vehicle device 100, the controller 102 initiates a local path planning method (for example, Dynamic Window Approach (DWA)) to avoid the obstacle. This method, in conjunction with increasing the detour density of the vehicle device 100, may increase the precision of detour in a region having an obstacle, thereby collecting denser measurement data.

In step S208, the network quality measurer 104 measures the network quality in the space according to the measurement frequency to generate network quality data. Next, in step S210, the controller 102 determines whether the network quality in the space is changed according to the network quality data. When the controller 102 determines that the network quality in the space is changed, step S206 is performed, and the controller 102 adjusts at least one of the movement path, the movement speed, and the measurement frequency. Then, returning to step S202, the controller 102 controls the vehicle device 100 to move on the adjusted movement path at the adjusted movement speed.

The controller 102 determines whether the measurement result of the network quality at the time is significantly lower than a certain threshold or has a significant change. Moreover, when the controller 102 determines that the measurement result of the network quality at that time is significantly lower than a certain threshold value or has a significant change, the controller 102 adjusts at least one of the movement path, the movement speed, and the measurement frequency (such as reducing the movement speed or adjusting the detour density). In an embodiment, the change may be directly determined via a record of changes over time during the movement of the vehicle device 100. In another embodiment, the changes may also be determined after the movement record of the vehicle device 100 and the measurement record of the network quality measurer 104 are synchronized first and then converted to a quality measurement value spatial distribution record. This method of converting data from the time domain to the space domain is described in detail in FIG. 3.

Returning to step S204 and step S210, when the obstacle detector 106 detects that there is no obstacle around the vehicle device 100 or the controller 102 determines that the network quality in the space is not changed, step S202 is repeated, wherein the vehicle device 100 continues to move on the original movement path at the original movement speed, and the obstacle detector 106 and the network quality measurer 104 continue to perform detection and measurement until a return-to-home condition is met (for example, the vehicle device 100 completes the detour), and the vehicle device 100 executes the return-to-home.

In an embodiment, the controller 102 receives an external command, adjusts at least one of the movement path, the movement speed, and the measurement frequency according to the external command, and updates the measurement record in the memory 112 according to at least one of the adjusted movement path, movement speed, and measurement frequency. Then, the controller 102 controls the vehicle device 100 to move on the adjusted movement path at the adjusted movement speed.

Figure 3:
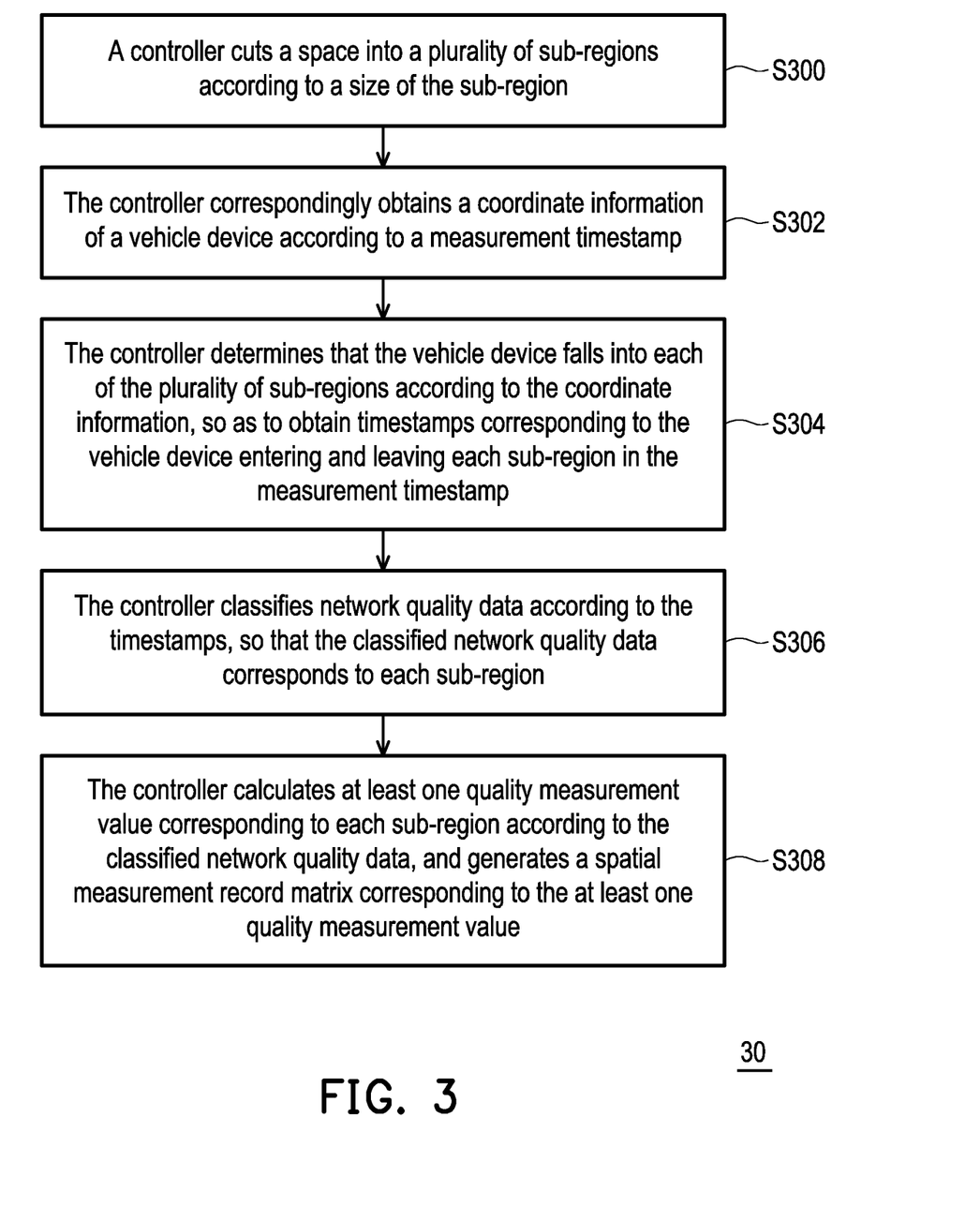
FIG. 3 is a flowchart of a method for converting data from a time domain to a space domain shown according to an embodiment of the disclosure.

FIG. 3 is a flowchart of a method for converting data from a time domain to a space domain shown according to an embodiment of the disclosure.

During the measurement process of the vehicle device 100, in addition to recording various data related to the vehicle device 100 (such as speed, coordinates, detour status, obstacle distance, etc.), the memory 112 also records various data measured by the network quality measurer 104 (for example, available bandwidth, response latency, network jitter, packet loss rate, RSSI, etc.) In an embodiment, the data are all recorded over time, and each is independently stored in the memory 112.

In the present embodiment, the determination of whether the network quality is changed in step S210 in FIG. 2 needs to be performed after the data recorded over time is converted into a spatially varying quality measurement value spatial distribution record. The controller 102 samples and transforms the network quality data of the vehicle device 100 in the space according to a predetermined sub-region size to determine whether the network quality in the space is changed.

Referring to both FIG. 1 and FIG. 3, a method 30 of the present embodiment is applicable to the network quality measurement system 10 of FIG. 1. The following is a description of the detailed steps of the method of converting data from time domain to space domain of the disclosure in conjunction with the operation relationship between the devices in the network quality measurement system 10.

First, in step S300, the controller 102 cuts the space into a plurality of sub-regions according to the sub-region size. For example, the controller 102 cuts the space to be measured into M*N*K sub-regions according to the sub-region size Gsize, and establishes a coordinate system corresponding to M*N*K, and each of the sub-regions has a corresponding sub-region coordinate index Gi=(x,y,z). In an embodiment, one space of 50 meters by 50 meters by 20 meters is measured out, and the sub-region size Gsize may be 125 cubic meters (5 meters by 5 meters by 5 meters) or any value, but the disclosure not limited thereto. In an embodiment, M, N, and K are 10, 10, and 4, and all are positive integers.

Then, in step S302, the controller 102 correspondingly obtains the coordinate information of the vehicle device 100 according to the measurement timestamp. In an embodiment, the coordinate information of the vehicle includes a record of time and the coordinate parameter of the vehicle at that point in time. The coordinate parameter may be a global coordinate system (such as GPS longitude, latitude, and altitude), or the distance value of a three-dimensional coordinate system relative to a certain origin. In an embodiment, if the coordinates used are global coordinates (such as GPS), the displacement distance between the coordinates may be obtained via calculation.

In step S304, the controller 102 determines that the vehicle device 100 falls in each of the plurality of sub-regions according to the coordinate information, so as to obtain the timestamp corresponding to the vehicle device 100 entering and leaving each of the sub-regions in the measurement timestamp. Then, in step S306, the controller 102 classifies the network quality data according to the timestamp, so that the classified network quality data correspond to each of the sub-regions. In an embodiment, the controller 102 uses the timestamp of entering and leaving each of the sub-regions as an index, and calculates and obtains the sub-region coordinate index corresponding to the network quality data recorded in the memory 112 according to the distance value obtained via the coordinate parameter and the sub-region size Gsize, and corresponds the recorded network quality data to each of the sub-regions.

In step S308, the controller 102 calculates at least one quality measurement value corresponding to each of the sub-regions according to the classified network quality data, and generates a spatial measurement record matrix corresponding to the at least one quality measurement value. In some embodiments, the indicators used to measure network quality are: packet response time, packet loss rate, network jitter, available bandwidth, signal-to-interference plus noise ratio, RSSI, etc. The calculation method may be to calculate the average value of the network quality data in the sub-regions (for example, calculate the average response time of 10 packets via an arithmetic average method); or calculate the score value (for example, the score value of 1 to 20) via a quantified calculation; or, after the score values of various measurement data are calculated, calculate a single quality measurement value by adding weights according to application requirements.

In the present embodiment, the conversion of the data recorded over time into the spatially varying quality measurement value spatial distribution record mainly has the following two functions:

First, the controller 102 may compare at least one quality measurement value of an adjacent sub-region in the three-dimensional space, and when the difference of the at least one quality measurement value of the adjacent sub-region is greater than a threshold value, the controller 102 determines that the network quality in the space is changed significantly. Significant changes in network quality may be due to signal obscuration or signal interference. In an embodiment, the movement mode of the vehicle device 100 or the conditions of the measurement density may be triggered to be adjusted in the measurement process to enhance the measurement in this region. Moreover, the controller 102 may also adjust the initial sub-region size Gsize to obtain a denser sub-region to calculate a more accurate gradient. This approach may solve the issue that the measurement change of the movement direction of the non-vehicle device 100 cannot be detected due to the lack of the concept of space when determining from time alone.

Second, the terminal device 200 may also adopt the quality measurement value spatial distribution record to establish the measurement quality distribution of the entire stereoscopic space, and present the quality measurement value of each of the sub-regions in a specific color or material. This method of visualizing a measurement result is described in detail in FIG. 4.

Figure 4:
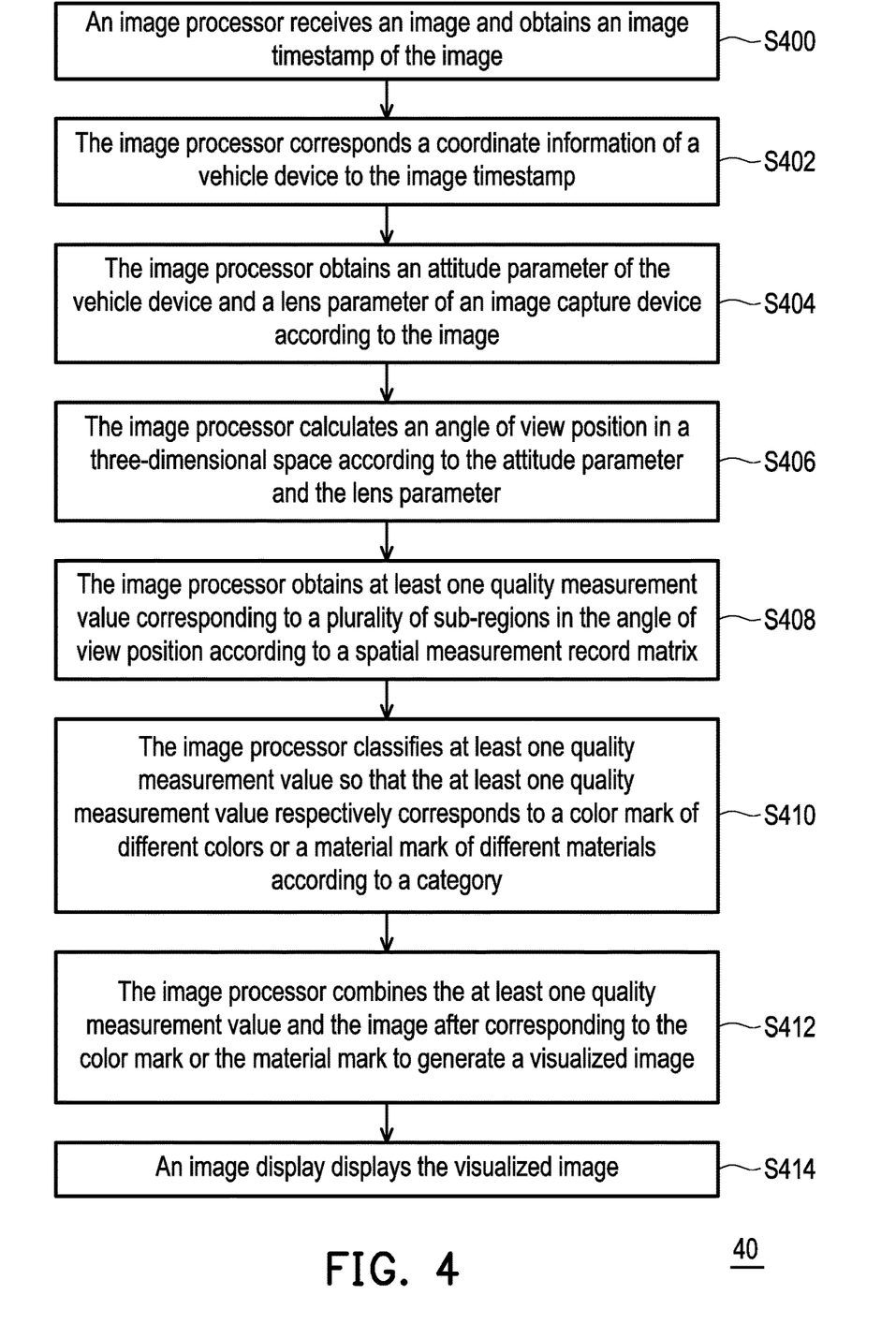
FIG. 4 is a flowchart of a method for visualizing a measurement result shown according to an embodiment of the disclosure.

FIG. 4 is a flowchart of a method for visualizing a measurement result shown according to an embodiment of the disclosure. Referring to both FIG. 1 and FIG. 4, a method 40 of the present embodiment is applicable to the network quality measurement system 10 of FIG. 1. The following is a description of the detailed steps of the method of visualizing a measurement result of the disclosure in conjunction with the operation relationship between the devices in the network quality measurement system 10.

First, in step S400, the image processor 202 receives an image from the image capture device 114, and obtains the image timestamp of the image. In step S402, the image processor 202 corresponds the coordinate information of the vehicle device 100 to the image timestamp. In step S404, the image processor 202 obtains the attitude parameter of the vehicle device 100 and the lens parameter of the image capture device 114 according to the image.

In step S406, the image processor 202 calculates the angle of view position in the three-dimensional space according to the attitude parameter and the lens parameter. Next, in step S408, the image processor 202 obtains at least one quality measurement value corresponding to a plurality of sub-regions in the angle of view position according to the spatial measurement record matrix. In step S410, the image processor 202 classifies at least one quality measurement value so that the at least one quality measurement value corresponds to a color mark of different colors or a material mark of different materials according to the category. In step S412, the image processor 202 combines at least one quality measurement value after corresponding to the color mark or the material mark and the image to generate a visualized image.

In an embodiment, the image processor 202 may determine the currently visible range of the visualized image according to the lens parameter (such as the angle of view), vehicle coordinates, and vehicle attitude, thereby determining the quality measurement value of the sub-region that needs to be rendered. In an embodiment, when the image processor 202 draws the quality measurement value of the visualized image, the position and size of the visualized material in the planar image that should be drawn may be calculated using a perspective projection method. In an embodiment, the coordinate parameter may be a global coordinate system (such as GPS longitude, latitude, and altitude), or the distance value of a three-dimensional coordinate system relative to a certain origin. The attitude parameter may be roll angle, pitch angle, and yaw angle of the aircraft relative to the coordinate system at the time, and in an embodiment, may be represented by three Yura angle values or in a quaternion manner. In an embodiment, if the angle of the lens may be different from the heading of the aircraft due to the installation method or the rotation of the lens itself, the attitude parameter also includes the rotation angle of the lens itself.

Figure 5:
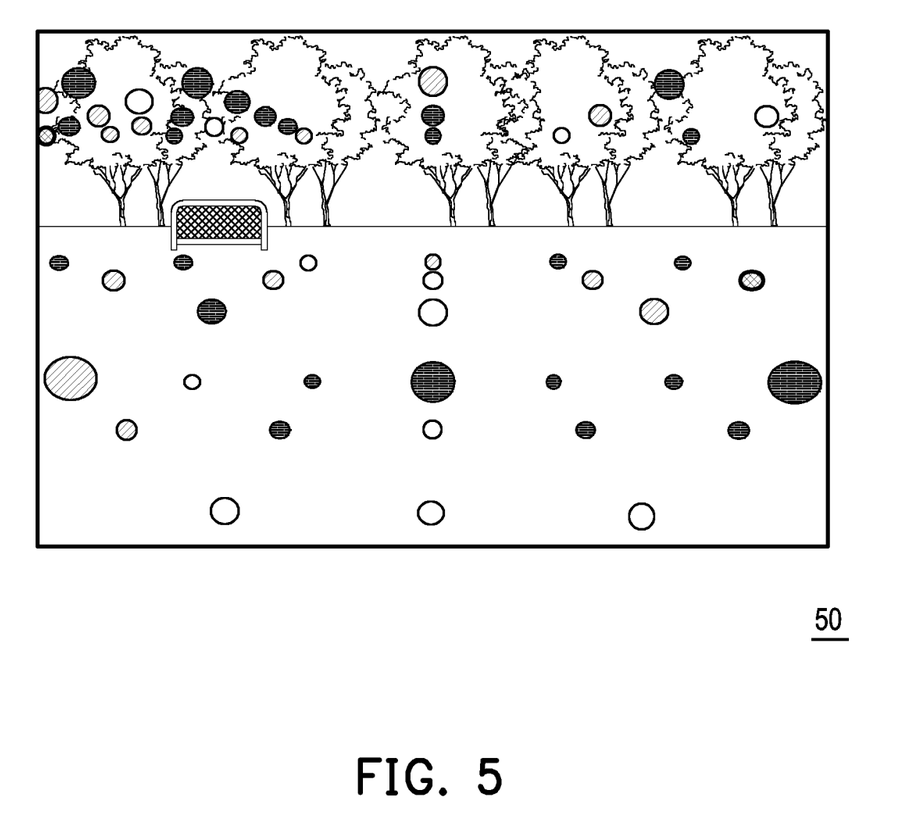
FIG. 5 is a stereoscopic view of the visualization of a measurement result shown according to an embodiment of the disclosure.

In step S414, the image display 204 displays the visualized image generated by the image processor 202. For example, FIG. 5 is a mixed reality view of the visualization of a measurement result shown according to an embodiment of the disclosure. In a visualized image 50, different texture or color can be used to render onto the image to different quality measurement values, which may visually present the measurement result in the image.

In an embodiment, when an image update is received from the image capture device 114 (for example, when an image record file is played or a streaming image is updated), steps S400 to S414 are repeated.

In an embodiment, when the coordinate information and attitude parameter corresponding to the image timestamp of the image are received from the image capture device 114, the image processor 202 simultaneously calculates and updates the angle of view position in the three-dimensional space, and changes the visualized image that needs to be drawn in the image.

In an embodiment, in the process of performing the visualization of a measurement result, if the image processor 202 finds that there is information about the obstacle distance recorded in the memory 112, or other vehicle control behavior information related to enhanced region measurement (such as speed change, increase of detour points) or adjustment of measurement information interval, the image processor 202 also enhances the presentation effect of this region in the process of visualizing the measurement result. Therefore, when converting data from time domain to space domain, the controller 102 determines whether to adjust the sub-region size Gsize for cutting the measurement space according to information such as obstacle distance, movement speed, or measurement frequency, so that the image processor 202 may dynamically change the visualization of the measurement result.

Figure 6:
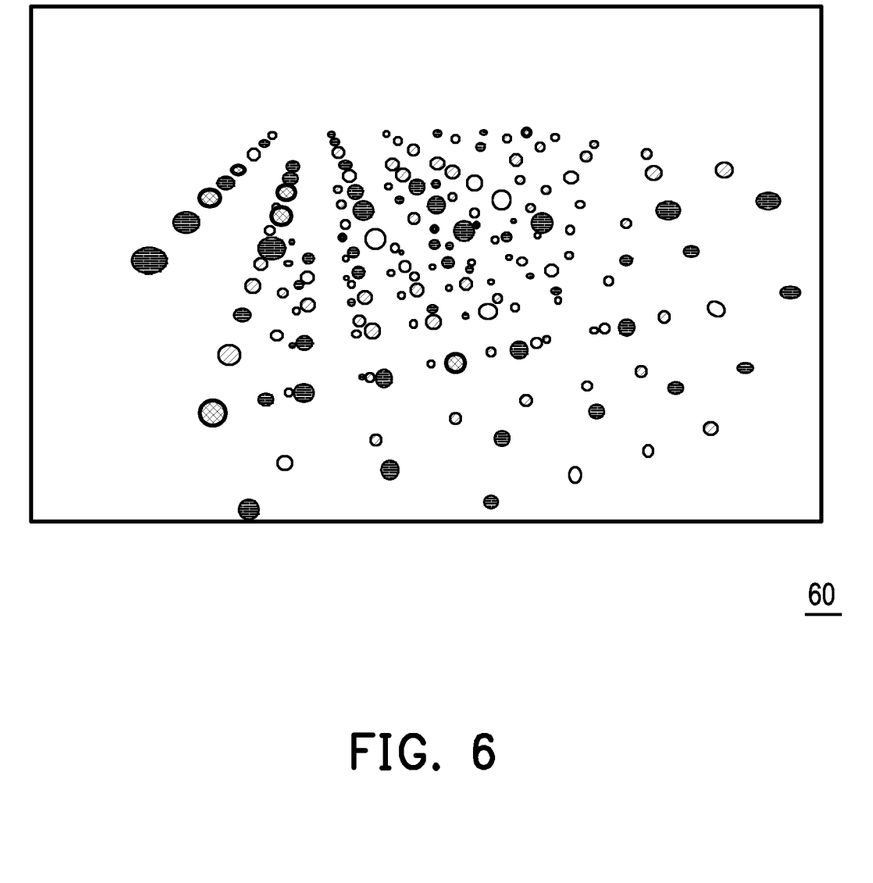
FIG. 6 is a stereoscopic view of the visualization of a measurement result shown according to another embodiment of the disclosure.

In an embodiment, the image processor 202 may directly obtain at least one quality measurement value corresponding to a plurality of sub-regions in the space from the spatial measurement record matrix in the memory 112, and present the at least one quality measurement value using different colors or materials to generate a visualized image. For example, FIG. 6 is a stereoscopic view of the visualization of a measurement result shown according to another embodiment of the disclosure. In a visualized image 60, different material renderings represent different quality measurement values, which may visually present the measurement result in the space.

The specific order and/or hierarchy of the steps in the method of an embodiment of the disclosure is an exemplary approach. Based on design preferences, the specific order or hierarchy of the steps of the disclosed method or process may be rearranged while remaining within the scope of the embodiments of the disclosure. Therefore, those of ordinary skill in the art will understand that the methods and techniques of the embodiments of the disclosure present various steps or actions in a sample order, and the embodiments of the disclosure are not limited to the specific order or hierarchy presented, unless explicitly stated otherwise.

Based on the above, when an obstacle around the aerial vehicle or significant changes in the network quality in space are detected, the network quality measurement method and system of the disclosure may automatically change the movement path and movement speed of the aerial vehicle or the measurement frequency of network quality to enhance the measurement for regions with poor network quality. Therefore, network deployment may be dynamically adjusted and network time may be reduced. In addition, this method may also combine images to visually present a measurement result, thereby efficiently presenting the good and bad distribution of network quality in the entire measurement space.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A network quality measurement method suitable for a vehicle device, comprising:
   determining a movement path and a movement speed of a vehicle device according to a size of a space and an endurance time of the vehicle device, and controlling the vehicle device to move on the movement path at the movement speed;
   measuring a network quality in the space according to a measurement frequency during a movement of the vehicle device to generate network quality data;
   determining whether the network quality in the space is changed according to the network quality data;
   detecting whether there is an obstacle around the vehicle device; and
   adjusting at least one of the movement path, the movement speed, and the measurement frequency when it is determined that the network quality in the space is changed or the obstacle is detected around the vehicle device.

2. The network quality measurement method of claim 1, further comprising:
   obtaining the size of the space;
   obtaining a coordinate information of the vehicle device according to the size of the space and the measurement frequency;
   obtaining a measurement timestamp measuring a current network quality according to a clock signal generated by the vehicle device; and
   integrating the coordinate information and the measurement timestamp to generate a measurement record, and the measurement record comprises the movement speed, the movement path, the measurement frequency, and the network quality data corresponding to the coordinate information and the measurement timestamp.

3. The network quality measurement method of claim 2, wherein the step of adjusting at least one of the movement path, the movement speed, and the measurement frequency when detecting that there is the obstacle around the vehicle device comprises:
   obtaining, when the obstacle detector detects that the obstacle is within a predetermined distance from the vehicle device, an obstacle distance between the vehicle device and the obstacle, adjusting at least one of the movement path, the movement speed, and the measurement frequency according to the obstacle distance, and updating the measurement record according to at least one of the adjusted movement path, movement speed, and measurement frequency and the obstacle distance.

4. The network quality measurement method of claim 2, further comprising:
   receiving an external command, adjusting at least one of the movement path, the movement speed, and the measurement frequency according to the external command, and updating the measurement record according to at least one of the adjusted movement path, movement speed, and measurement frequency.

5. The network quality measurement method of claim 2, wherein the step of determining whether the network quality in the space is changed according to the network quality data comprises:
sampling and transforming the network quality data of the vehicle device in the space according to a predetermined sub-region size to determine whether the network quality in the space is changed.

6. The network quality measurement method of claim 5, further comprising:
cutting the space into a plurality of sub-regions according to the sub-region size;
obtaining the coordinate information of the vehicle device according to the measurement timestamp correspondingly;
determining that the vehicle device falls in each of the plurality of sub-regions according to the coordinate information, so as to obtain a timestamp corresponding to the vehicle device entering and leaving each of the sub-regions in the measurement timestamp;
classifying the network quality data according to the timestamp, so that the classified network quality data corresponds to each of the sub-regions; and
calculating at least one quality measurement value corresponding to each of the sub-regions according to the classified network quality data, and generating a spatial measurement record matrix corresponding to the at least one quality measurement value.

7. The network quality measurement method of claim 6, wherein the at least one quality measurement value of an adjacent sub-region is compared, and when a difference between the at least one quality measurement value of the adjacent sub-region is greater than a threshold value, it is determined that the network quality in the space is changed.

8. The network quality measurement method of claim 6, wherein the at least one quality measurement value of an adjacent sub-region is compared, and when a difference between the at least one quality measurement value of the adjacent sub-region is greater than a threshold value, the sub-region size is adjusted, and the space is cut into a plurality of sub-regions according to the adjusted sub-region size.

9. The network quality measurement method of claim 6, further comprising:
capturing an image during the movement via the vehicle device.

10. The network quality measurement method of claim 9, further comprising:
receiving the image and obtaining an image timestamp of the image;
corresponding the coordinate information of the vehicle device to the image timestamp;
obtaining an attitude parameter of the vehicle device and a lens parameter according to the image;
calculating an angle of view position in a three-dimensional space according to the attitude parameter and the lens parameter;
obtaining the at least one quality measurement value corresponding to a plurality of sub-regions in the angle of view position according to the spatial measurement record matrix;
classifying the at least one quality measurement value so that the at least one quality measurement value corresponds to a color mark of different colors or a material mark of different materials according to a category;
combining the at least one quality measurement value after corresponding to the color mark or the material mark and the image to generate a visualized image; and
displaying the visualized image.

11. A network quality measurement system, comprising:
a vehicle device, comprising:
a controller configured to determine a movement path and a movement speed of a vehicle device according to a size of a space and an endurance time of the vehicle device and control the vehicle device to move on the movement path at the movement speed;
a network quality measurer coupled to the controller and configured to measure a network quality in the space according to a measurement frequency during a movement of the vehicle device to generate network quality data; and
an obstacle detector coupled to the controller and configured to detect whether there is an obstacle around the vehicle device,
wherein the controller determines whether the network quality in the space is changed according to the network quality data, and when the controller determines that the network quality in the space is changed or the obstacle detector detects the obstacle is around the vehicle device, the controller adjusts at least one of the movement path, the movement speed, and the measurement frequency.

12. The network quality measurement system of claim 11, wherein the vehicle device further comprises:
a locator coupled to the controller and configured to obtain the size of the space, and the controller obtains a coordinate information of the vehicle device via the locator according to the size of the space and the measurement frequency;
a timer coupled to the controller and configured to generate a clock signal, and the controller obtains a measurement timestamp measuring a current network quality according to the clock signal; and
a memory coupled to the controller, wherein the controller integrates the coordinate information and the measurement timestamp to generate a measurement record, and stores the measurement record in the memory, and the measurement record comprises the movement speed, the movement path, the measurement frequency, and the network quality data corresponding to the coordinate information and the measurement timestamp.

13. The network quality measurement system of claim 12, wherein when the obstacle detector detects that the obstacle is within a predetermined distance from the vehicle device, the controller obtains an obstacle distance between the vehicle device and the obstacle, adjusts at least one of the movement path, the movement speed, and the measurement frequency according to the obstacle distance, and updates the measurement record according to at least one of the adjusted movement path, movement speed, and measurement frequency and the obstacle distance.

14. The network quality measurement system of claim 12, wherein the controller receives an external command, adjusts at least one of the movement path, the movement speed, and the measurement frequency according to the external command, and updates the measurement record according to at least one of the adjusted movement path, movement speed, and measurement frequency.

15. The network quality measurement system of claim 12, wherein the controller samples and transforms the network quality data of the vehicle device in the space according to a predetermined sub-region size to determine whether the network quality in the space is changed.

16. The network quality measurement system of claim 15, wherein the controller
cuts the space into a plurality of sub-regions according to the sub-region size,
obtains the coordinate information of the vehicle device according to the measurement timestamp correspondingly,
determines that the vehicle device falls in each of the plurality of sub-regions according to the coordinate information, so as to obtain a timestamp corresponding to the vehicle device entering and leaving each of the sub-regions in the measurement timestamp,
classifies the network quality data according to the timestamp, so that the classified network quality data corresponds to each of the sub-regions, and
calculates at least one quality measurement value corresponding to each of the sub-regions according to the classified network quality data, and generates a spatial measurement record matrix corresponding to the at least one quality measurement value.

17. The network quality measurement system of claim 16, wherein the controller compares the at least one quality measurement value of an adjacent sub-region, and when a difference between the at least one quality measurement value of the adjacent sub-region is greater than a threshold value, the controller determines that the network quality in the space is changed.

18. The network quality measurement system of claim 16, wherein the controller compares the at least one quality measurement value of an adjacent sub-region, and when a difference between the at least one quality measurement value of the adjacent sub-region is greater than a threshold value, the controller adjusts the sub-region size, and cuts the space into a plurality of sub-regions according to the adjusted sub-region size.

19. The network quality measurement system of claim 16, wherein the vehicle device further comprises:
an image capture device configured to capture an image during the movement.

20. The network quality measurement system of claim 19, further comprising:
a terminal device, comprising:
an image processor coupled to the memory and the image capture device and configured to:
receive the image and obtain an image timestamp of the image,
corresponding the coordinate information of the vehicle device to the image timestamp,
obtain an attitude parameter of the vehicle device and a lens parameter of the image capture device according to the image,
calculate an angle of view position in a three-dimensional space according to the attitude parameter and the lens parameter,
obtain the at least one quality measurement value corresponding to a plurality of sub-regions in the angle of view position according to the spatial measurement record matrix,
classify the at least one quality measurement value so that the at least one quality measurement value corresponds to a color mark of different colors or a material mark of different materials according to a category, and
combine the at least one quality measurement value after corresponding to the color mark or the material mark and the image to generate a visualized image; and
an image display coupled to the image processor and configured to display the visualized image.

* * * * *